United States Patent Office 3,463,777
Patented Aug. 26, 1969

3,463,777
ORTHOESTER PROCESS FOR PRODUCING 1,4,5,6-TETRAHYDRO-AS-TRIAZINE
Donald L. Trepanier, Indianapolis, Ind., assignor to The Dow Chemical Company, Midland, Mich., a corporation of Delaware
No Drawing. Filed Dec. 5, 1966, Ser. No. 598,947
Int. Cl. C07d 55/10; A61k 27/00
U.S. Cl. 260—248                      6 Claims

ABSTRACT OF THE DISCLOSURE 1,4,5,6-tetrahydro-as-triazines, such as 3-ethyl-1,4,5,6-tetrahydro-as-triazine and 1,3,5-trimethyl-1,4,5,6-tetrahydro-as-triazine, are prepared by the reaction of an orthoester with a β-aminohydrazine. The 1,4,5,6-tetrahydro-as-triazine products have pharmacological activity. For example, 1,3,5-trimethyl-1,4,5,6-tetrahydro-as-triazine has analgesic activity as indicated by its antagonism of hydrochloric acid induced writhing in mice.

---

The present invention is directed to a new method of producing 1,4,5,6-tetrahydro-as-triazine compounds corresponding to the formula

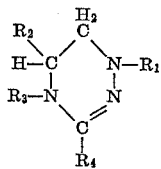

In this and succeeding formulae to be found in the present specification and claims, $R_1$ represents hydrogen or methyl, $R_2$ independently represents hydrogen or methyl, $R_3$ represents hydrogen, methyl or ethyl and $R_4$ represents methyl and ethyl. These compounds, prepared by the new process of the present invention, have been found to be pharmacologically active and are claimed in a copending application Ser. No. 598,977 filed even date herewith by Trepanier and Harris.

The new process of the present invention comprises reacting a β-aminohydrazine corresponding to the formula

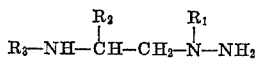

with an ortho ester selected from the group consisting of tri-lower alkyl orthoacetates and tri-lower alkyl orthopropionates.

In the present specification and claims "lower alkyl" represents an alkyl moiety containing from 1 to 4 carbon atoms. In a convenient procedure, the reactants are contacted in the presence of an inert organic solvent as reaction medium; however, the reaction proceeds readily in the absence of an inert organic solvent. Representative inert organic solvents employed as reaction medium in the present invention include ethanol, chloroform, ethyl acetate, methanol, methylene chloride and ethyl propionate.

The reaction proceeds readily at temperatures from about 50° to about 150° C. and under ordinary atmospheric pressures with the production of the desired product. In a convenient procedure, the reaction is carried out at the boiling temperature of the reaction mixture and under reflux. The reaction consumes the reactants in equimolar proportions and optimum yields are obtained when the reactants are employed in such proportions. While the reaction proceeds when the reactants are employed in molar proportions other than substantially equimolar proportions, large excesses of either reactant results in the production of tar with the result that it is difficult to separate the desired product. Representative ortho esters employed as starting materials include trimethyl orthoacetate, tripropyl orthoacetate, tributyl orthoacetate, trimethyl orthopropionate, tripropyl orthopropionate and tributyl orthopropionate.

In carrying out the new method of the present invention, the β-aminoalkylkylhydrazine and ortho esters are intimately contacted in any convenient fashion. In a convenient procedure, the reactants are contacted in an inert organic solvent as reaction medium. The temperature of the reaction mixture is maintained within the reaction temperature range for from about 10 to 80 hours. Following the reaction period, the reaction mixture is fractionally distilled to separate the low boiling constituents and obtain the 1,4,5,6-tetrahydro-as-triazine product. The product can then be further purified by conventional procedures such as washing with an appropriate organic solvent, crystallization or distillation.

The following examples are merely illustrative and are not intended to be limiting.

Example 1

Triethyl orthopropionate (17.6 grams; 0.10 mole) and 1-(β-aminoethyl)-1-methylhydrazine (8.9 grams; 0.10 mole) were dispersed in 50 milliliters of ethyl acetate. The reaction mixture thus prepared was heated at the boiling temperature and under reflux for 65 hours. Following the reflux period an additional 50 milliliters of ethyl acetate—ethanol azeotrope (B.P. 70–73° C., 31 percent ethanol) removed by distillation. The remainder of the reaction mixture was concentrated under reduced pressure and then vacuum distilled to obtain the 1-methyl-3-ethyl-1,4,5,6-tetrahydro-as-trazine as a fraction boiling at 99°–101° C. under pressure equivalent to 0.3 mm. of mercury.

The following compounds of the present invention are prepared in a similar fashion.

1,3-dimethyl-1,4,5,6-tetrahydro-as-triazine (B.P. 73°–75° C. under pressure equivalent to 0.5 mm. Hg) by reacting together 1-(β-aminoethyl)-1-methylhydrazine and triethyl ortho-acetate in ethyl acetate.

1,3,5-trimethyl-1,4,5,6-tetrahydro-as-triazine (B.P. 74°–76° C. at 0.7 mm. of Hg) by reacting together 1-(2-amino-propyl)-1-methylhydrazine and triethyl orthoacetate in chloroform.

In a standard pharmacological test, 3-ethyl-1,4,5,6-tetrahydro-as-triazine when injected into mice in a single dose of 400 mg./kg., gave protection against the effects of hyperexcitability induced by the injection of a large dose (20 mg./kg.) of d-amphetamine sulfate. In a further representative pharmacological test, 1,3,5,-trimethyl-1,4,5,6-tetrahydro-as-triazine, when injected intraperitoneally at a concentration of 200 mg./kg. protected mice against writhing induced by the intraperitoneal injection of hydrochloric acid (10 mg./kg. of 0.1 percent HCl). The hydrochloric acid was injected 30 minutes after the 1,4,5,6-tetrahydro-as-triazine was injected.

What is claimed is:
1. The method of producing a 1,4,5,6-tetrahydro-as-triazine compound corresponding to the formula

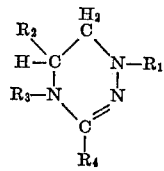

wherein $R_1$ represents a member of the group consisting of hydrogen and methyl, $R_2$ independently represents a member of the group consisting of hydrogen and methyl, $R_3$ represents a member of the group consisting of hydrogen, methyl and ethyl and $R_4$ represents a member of the group consisting of methyl and ethyl, which comprises reacting a β-aminohydrazine corresponding to the formula

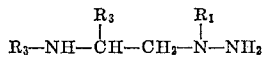

$$R_3\text{—NH—}\overset{R_3}{\underset{|}{C}}\text{H—CH}_2\text{—}\overset{R_1}{\underset{|}{N}}\text{—NH}_2$$

wherein $R_1$ represents a member of the group consisting of hydrogen and methyl, $R_2$ independently represents a member of the group consisting of hydrogen and methyl and $R_3$ independently represents a member of the group consisting of hydrogen, methyl and ethyl, with an orthoester selected from the group consisting of lower alkyl orthoacetates and lower alkyl orthopropionates in which "lower alkyl" represents an alkyl moiety containing from 1 to 4 carbon atoms.

2. The process claimed in claim 1 wherein the reaction is carried out at a temperature of from 50° to 150° C.

3. The method claimed in claim 1 which comprises reacting triethyl orthopropionate and 1-(β-aminoethyl)-1-methylhydrazine.

4. The method claimed in claim 1 which comprises reacting triethyl orthoacetate and 1-(β-aminoethyl)-1-methylhydrazine.

5. The method claimed in claim 1 which comprises reacting 1-(β-amino-β-methylethyl) - 1 - methylhydrazine and triethyl orthoacetate.

6. The method claimed in claim 1 which comprises reacting triethyl orthopropionate and 1-(β-amino-β-methylethyl)-1-hydrazine.

References Cited

UNITED STATES PATENTS 2,817,682    12/1957    Ratz.

FOREIGN PATENTS 542,024    6/1957    Canada.

HENRY R. JILES, Primary Examiner

J. M. FORD, Assistant Examiner

U.S. Cl. X.R.

260—999